W. H. WHITTLESEY.
GANG PLOW.
APPLICATION FILED SEPT. 15, 1914.

1,177,558.

Patented Mar. 28, 1916.
2 SHEETS—SHEET 1.

Witnesses
Gerald Hennessy
V. B. Hillyard

Inventor
W. H. Whittlesey,
By Victor J. Evans
Attorney

W. H. WHITTLESEY.
GANG PLOW.
APPLICATION FILED SEPT. 15, 1914.

1,177,558.

Patented Mar. 28, 1916.
2 SHEETS—SHEET 2.

Witnesses
Gerald Hennessy
V. B. Hillyard

Inventor
W. H. Whittlesey,
By Victor J. Evans
Attorney

UNITED STATES PATENT OFFICE.

WILLIAM H. WHITTLESEY, OF BUSHNELL, ILLINOIS.

GANG-PLOW.

1,177,558.  Specification of Letters Patent.  Patented Mar. 28, 1916.

Application filed September 15, 1914. Serial No. 861,884.

*To all whom it may concern:*

Be it known that I, WILLIAM H. WHITTLESEY, a citizen of the United States, residing at Bushnell, in the county of McDonough and State of Illinois, have invented new and useful and Improvements in Gang-Plows, of which the following is a specification.

This invention provides an improved implement intended chiefly for tilling the soil when preparing the same to receive the seed, such implement embodying shovels for breaking the ground, rotary cutters for reducing clods, and a roller for leveling and pulverizing the soil.

The invention consists of a main frame mounted upon caster wheels and a roller, a gang of shovels for opening the soil and adjustable vertically to regulate the depth to which the shovels may penetrate the soil, a gang of rotary cutters arranged in the rear of the shovels for breaking up clods, such rotary cutters being adjustable vertically with the shovels as well as independently thereof, and a roller embodying a plurality of annular ribs, and rings arranged between such annular ribs and having a limited eccentric movement whereby the ribs are kept free from accumulating soil and trash.

The invention consists of the novel features, details of construction and combination of parts, which hereinafter will be more particularly set forth, illustrated and claimed.

Figure 1:
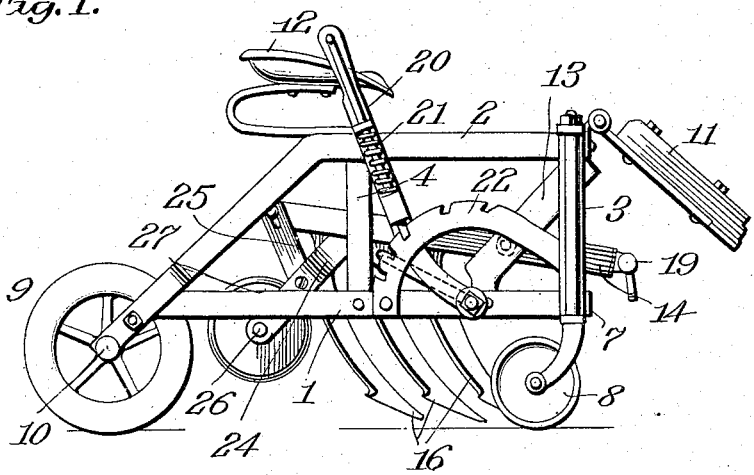
Figure 2:
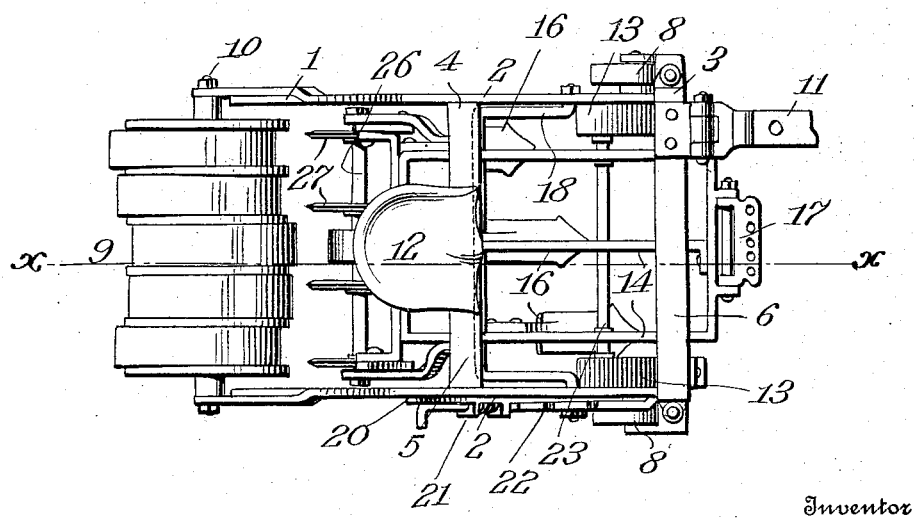
Figure 3:
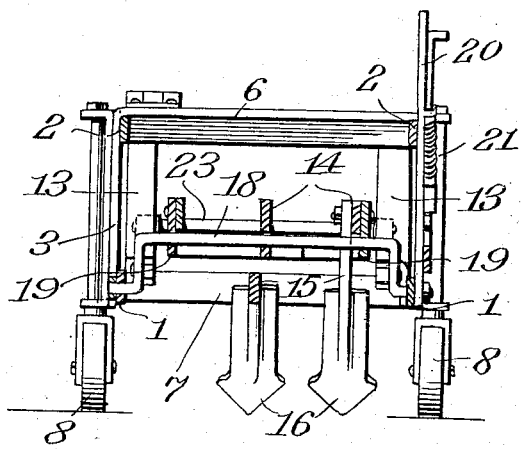
Figure 4:
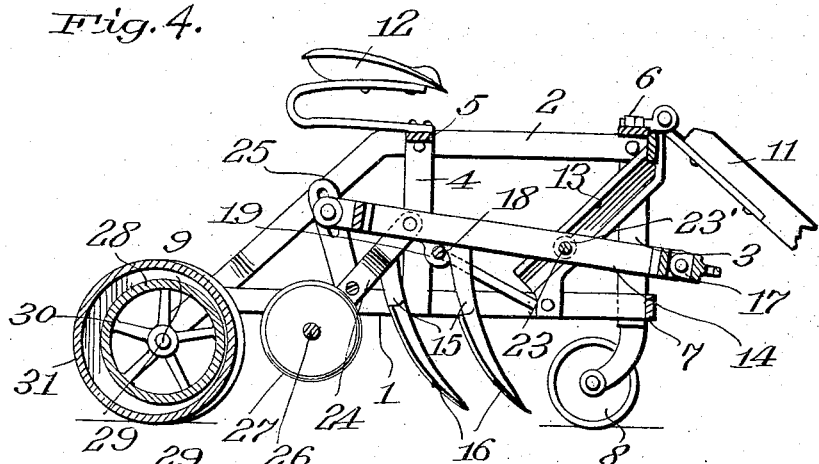
Figure 5:
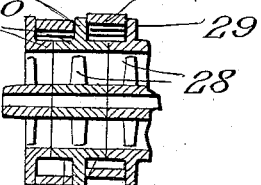

Figure 1 is a side view of a gang plow embodying the invention. Fig. 2 is a top plan view. Fig. 3 is a longitudinal section on the line $x$—$x$ of Fig. 2. Fig. 4 is a transverse section bringing out more clearly the relation of the arch to which the gang of shovel blades or plow points are attached. Fig. 5 is a detail view of a portion of the pulverizing roller.

Corresponding and like parts are referred to in the following description, and indicated in all the views of the drawings by the same reference characters.

The main frame comprises lower longitudinal bars 1 which have their rear ends curving downward, upper longitudinal bars 2 which have their rear portions inclined downwardly and attached to the rear ends of the lower longitudinal bars 1, and uprights 3 and 4 which are attached to the longitudinal bars 1 and 2 and connect the same. Transverse bars 5, 6, and 7 connect the longitudinal bars 1 and 2. The several bars are connected in any substantial manner. The main frame is supported upon caster wheels 8 and a pulverizing roller 9, the caster wheels being located at the front corners of the frame, and the roller 9 being located in the rear and mounted upon a rod 10 which is supported at its ends in openings formed in the lower rear ends of the longitudinal bars 1 and 2. The caster wheels 8 enable the main frame to follow the draft without requiring the use of a tongue, although a tongue is advantageous particularly when moving the implement from one place to another, hence a tongue 11 is pivotally connected to the transverse bar 6. A driver's seat 12 is mounted upon the transverse bar 5. Inclined guides 13 are arranged at the front end of the main frame and are secured at their lower ends to the longitudinal bars 1 and at their upper end to the uprights 3. The opposing sides of the inclined guides 13 are grooved or channeled to receive the ends of the rod which connects the forward portions of the beams provided with the shovel blades or plow points.

The gang of shovel blades or plow points comprise beams 14, standards 15, and blades 16, the latter being of any type usually employed for breaking the ground when preparing the same to receive the seed. It is to be understood that the gang may embody any number of beams 14 and standards 15, such beams and standards being connected in any convenient and substantial way to move in unison. A clevis 17 is attached to the front end of the gang of shovels to admit of the draft being applied directly thereto. An arch 18 has its side members journaled in the lower longitudinal bars 1 near the lower ends of the guides 13, the horizontal portion of such arch supporting the gang of shovels and passing through hangers 19 depending from and secured to the outermost beams 14. An operating lever 20 is secured to one of the journals of the arch and serves as means to admit of turning such arch to effect adjustment of the gang of shovels. The operating lever 20 is provided with the usual hand latch 21 arranged to coöperate with a notched segment 22 for holding the arch and gang of shovel blades in the required adjusted position. The rod 10 passes through openings formed near the front ends of the beams 14 and its end portions project beyond the outermost beams and are provided with rollers 23' which operate in the grooves or channels of the inclined guides 13. When the operating lever 20 is moved to raise the shovel blades or plow points 16, the front ends of the beams 14 are correspondingly elevated by reason of the ends of the rod 10 riding upward in the guides 13. When the shovel blades are lowered, the front ends of the beams 14 are correspondingly lowered by the ends of the rod 10 riding downward in the guides 13. Bars 24 are pivotally connected at their upper ends to the rear portions of the outermost beams 14 and braces 25 adjustably connect such bars with the rear ends of the beams 14 to which the bars 24 are connected. The shaft 26 is mounted in bearings formed at the lower ends of the bars 24 and are provided with a plurality of rotary cutters 27. In the preferable arrangement, a rotary cutter 27 is provided for each of the cultivator shovels or plow points 16 so that the slice of earth turned by each shovel blade is reduced or cut up by the action of the cutters 27. It is observed that the gang of rotary cutters moves with the gang of shovel blades or plow points and furthermore that such gang of rotary cutters is adjustable vertically independently of the vertical adjustment of the cultivator shovels thereby admitting of the depth of action of the rotary cutters being regulated independently of the depth of action of the gang of shovel blades.

The pulverizing roller comprises a shaft 10 which is mounted in the lower rear ends of the longitudinal bars 1 and 2. A plurality of rotary elements are secured upon the shaft 10, each of such elements being in the form of a wheel and comprising a hub, spokes, and rim, the latter embodying a rib 29 and lateral flanges 30. The rib 29 is of annular form and serves to break up clods. The lateral flanges 30 are of like diameter and serve as supporting means for rings 31 which are mounted loose upon the lateral flanges 30 of adjacent rotary elements. The rings 31 are of a width to extend between adjacent ribs 29 and are of a diameter slightly greater than the flanges 30 and less than the ribs 29. The rings 31 overlap the joint formed between the adjacent rotary elements and serve to remove any earth or other matter that may tend to collect between the annular ribs 29 of the rotary elements. The rings 31 have an eccentric movement and are pressed upward against the flanges 30 by the loose earth when the implement is drawn over the field. The upper portions of the rings 31 come about flush with the upper edges of the ribs 29 and this relationship is preserved and as a result the spaces between the cutting and crushing ribs 29 are kept clear.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

In a gang plow a frame having supporting means and provided at its front end with forwardly and upwardly inclined guides, a shaft mounted in bearings in said frame at the lower rear ends of said guides and provided with a crank, a gang of the plow beams pivotally mounted on the crank of said shaft, a bar connecting the plow beams and provided with guiding means which operate in said inclined guides and means to turn said shaft to raise and lower the plow beams, and means to lock said shaft turning means in adjusted position.

In testimony whereof I affix my signature in presence of two witnesses.

WILLIAM H. WHITTLESEY.

Witnesses:
ELJAH P. ERWIN,
J. C. THOMPSON.

Copies of this patent may be obtained for five cents each, by addressing the "Commissioner of Patents, Washington, D. C."